United States Patent [19]

Lemmo

[11] 4,044,979
[45] Aug. 30, 1977

[54] HEDGE TRIMMER

[76] Inventor: Patrick V. Lemmo, 119 Scooter Lane, Hicksville, N.Y. 11801

[21] Appl. No.: 695,150

[22] Filed: June 11, 1976

[51] Int. Cl.² .................. F16F 15/00; F16M 1/00
[52] U.S. Cl. .................................. 248/13; 30/379; 248/123; 248/287; 248/371; 248/407
[58] Field of Search ............... 248/13, 287, 122, 371, 248/373, 407, 287, 148, 384, 123, 184; 30/379, 379.5, 296 R, 231, 196; 83/699, 700; 403/107

[56] References Cited

U.S. PATENT DOCUMENTS

| 937,480 | 10/1909 | Smith et al. | 248/287 X |
| 1,319,792 | 10/1919 | Phorson | 248/123 X |
| 1,386,108 | 8/1921 | Harding | 248/148 X |
| 1,894,743 | 1/1933 | Harter | 248/407 |
| 2,156,862 | 5/1939 | Maugard | 248/123 |
| 2,480,572 | 8/1949 | Gronquist | 248/123 X |
| 2,990,618 | 7/1961 | Petree et al. | 248/184 X |
| 3,185,422 | 5/1965 | Spindler | 248/287 X |
| 3,417,949 | 12/1968 | Waber | 248/13 |

Primary Examiner—Ramon S. Britts
Attorney, Agent, or Firm—Allen D. Brufsky

[57] ABSTRACT

Hedge trimming apparatus including a substantially horizontal platform pivotable along one edge of a base to level the apparatus relative to a hedge to be trimmed. Wheels and a handle are connected to the base to form a movable carriage for the apparatus. A vertically adjustable column on the platform and a horizontally adjustable shaft mounted on the column are provided to mount a bracket for retaining an electric hedge trimmer on the apparatus, whose position can be adjusted relative to the hedge by adjusting the position of the column and shaft, once the platform is levelled.

6 Claims, 2 Drawing Figures

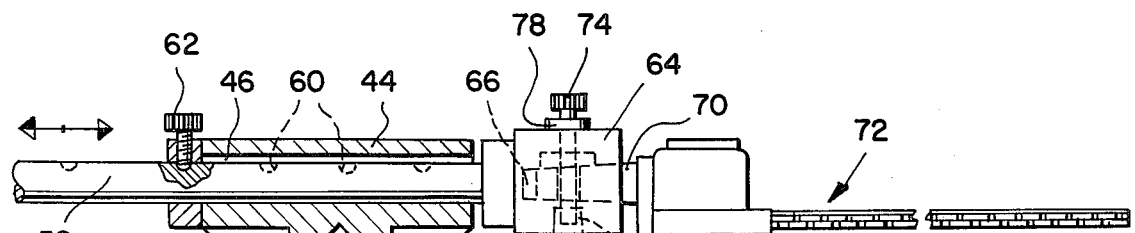
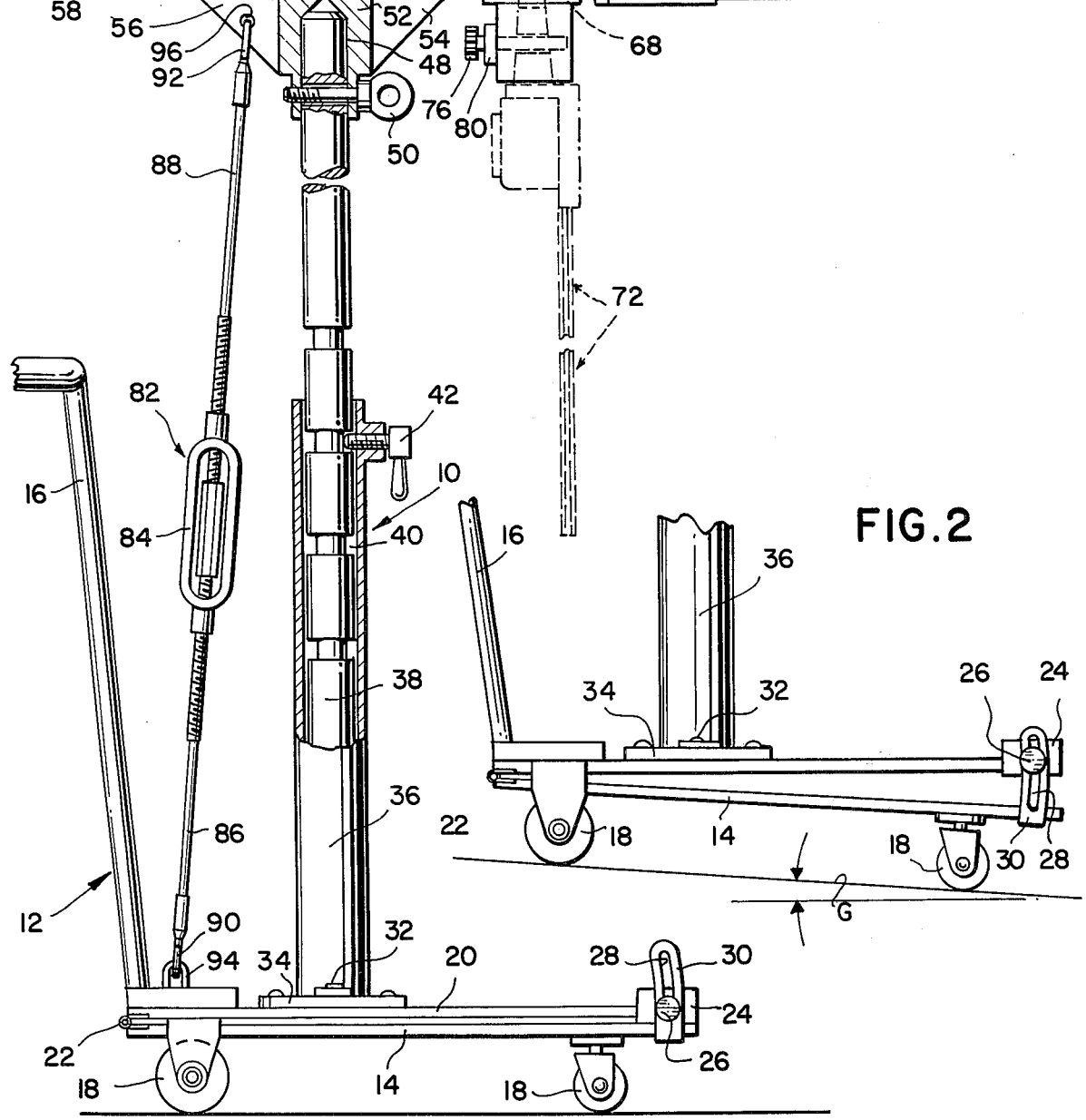

HEDGE TRIMMER

BACKGROUND OF THE INVENTION

This invention relates to a hedge trimmer apparatus and more particularly, to a hedge trimming carriage adapted to mount an adjustably positionable electric hedge trimmer which may be wheeled alongside a hedge to trim the same.

Many diverse types of hedge trimming machines are known whereby the top and sides of a hedge can be cut at any height. However, the adjustment of the hedge trimmer relative to the hedge is a slow and tedious task requiring the positioning and repositioning of the hedge clippers in a cumbersome and slow manner.

SUMMARY OF THE INVENTION

In accordance with this invention, the hedge trimmer apparatus comprises a wheeled carriage having an upright tubular pedestal mounted on a horizontal platform. The tubular pedestal contains a vertically adjustable column mounting a horizontal tube having a horizontally adjustable shaft projecting therethrough. An electric hedge trimmer is mounted in a bracket fixed to the horizontal shaft. By adjusting the height of the vertical column or horizontal projection of the horizontal shaft, the position of the hedge trimmer on the carriage is quickly and efficiently adjusted relative to the hedge. The horizontal platform is also tiltable relative to the carriage to level the hedge trimmer or cut the hedge at a desired angle. A level indicator can be provided on the platform to indicate that the platform is level relative to a horizontal surface.

BRIEF DESCRIPTION OF THE DRAWING

Further objects and advantages of the invention will become apparent from the following description and claims and from the accompanying drawing, wherein:

FIG. 1 is a side view in elevation of the hedge trimmer apparatus of the present invention, with portions thereof illustrated in section; and FIG. 2 is a view similar to FIG. 1 but with the mounting platform of the apparatus adjusted to level the apparatus relative to its carriage base.

DETAILED DESCRIPTION OF THE PREFERRED EMBODIMENT

Referring now to the drawing in detail, wherein like numerals indicate like elements throughout the several views, the hedge trimming apparatus 10 of the present invention includes a wheeled carriage 12 provided with a base 14, an upright handle structure 16, and a plurality of wheels 18 extending downwardly from base 14.

Handle structure 16 is connected to a horizontal platform 20 which is pivotably connected by a hinge 22 to one edge of base 14. A block 24 is fixed to an opposite edge of platform 20 and receives a screw 26 threadedly connected thereto. Screw 26 extends through an arcuate slot 28 in an arm 30 extending upwardly from a lateral edge of base 14. As shown in FIG. 2, platform 20 may be pivoted and tilted relative to base 14 into a horizontal position and locked in the horizontal position by screw 26 whose head engages the sides of slot 28 of arm 30, when base 14 is on a sloping ground surface G. A level indicator 32 provided on the mounting base 34 of a vertical pedestal 36 bolted to platform 20 is used to determine whether platform 20 has been truly adjusted to a horizontal position.

Vertical pedestal 36 is tubular and receives in telescoping arrangement a vertically adjustable column 38 provided with vertically spaced annular grooves 40. A set screw 42 extends through the wall of pedestal 36 and is engaged in one of the grooves 40 in column 38 to retain the column 38 in its vertical adjusted position relative to pedestal 36.

Mounted on the top of column 38 is a tubular sleeve 44 having a horizontal base 46 therethrough. Sleeve 44 has a vertically-extending base 48 in a vertical collar 52 seated on the top of column 38 and is fastened to the top of column 38 by a threaded pin 50 extending through aligned threaded openings in the vertical collar 52 on sleeve 44 and the top of column 38. Braces 54 and 56 extend between the vertical collar 52 and the horizontal portion of sleeve 44.

Extending through horizontal bore 46 in sleeve 44 is a slidably adjustable horizontal shaft 58. Detents 60 are formed in the surface of shaft 58 to receive a set screw 62 threadedly insertable through sleeve 44 which retains shaft 58 in a horizontally adjustable position.

A hedge trimmer mounting bracket 64 is fixed to one end of shaft 58 and has a horizontal conical bore 66 and a vertical conical bore 68, which alternatively receives a complementary shaped handle 70 of a double-edge electric hedge trimmer 72. A retaining screw 74 and 76 threadedly connected to nuts 78 and 80, respectively, are received through the handle 70 of hedge trimmer 72 to retain the hedge trimmer 72 in mounted position on bracket 64.

A counter-weight tensioning device 82, comprising a turn-buckle 84 connected to cables or rods 86 and 88 has a hook fastener 90 and 92 connected to rods 86 and 88, respectively. Hook 90 is engaged through a U-bolt 94 inserted in platform 20. Hook 92 is inserted through a hole 96 in brace 56 of tubular sleeve 44. By rotating turn-buckle 84 to shorten the length of rods 86 and 88, tension is exerted on sleeve 44 to support the weight of hedge trimmer 72.

Adjustments of hedge trimming apparatus 10 are simply accomplished after carriage 12 is wheeled into a position adjacent a hedge to be trimmed. Horizontal platform 20 is pivoted to a horizontal position indicated by level indicator 32 by simply loosening screw 26 and pivoting platform 20 relative to base 14 and retightening screw 26. The vertical extent of hedge trimmer 72 is adjusted by loosening set screw 42 and raising or lowering column 38 in pedestal 36 until one of the grooves 40 is adjacent set screw 42 and the set screw retightened. The column 38 may be swivelled in pedestal 36, if desired to position hedge trimmer 72 at an angle with respect to the hedge being trimmed and hook 92 then inserted in hole 96 in brace 56 and turn-buckle 84 tightened. The lateral extent of hedge trimmer 72 is adjusted by loosening set screw 62 and extending or retracting shaft 58 and retightening set screw 62, 80 as to seat it in one of the detents 60. Handle structure 16 is then pushed or pulled along the hedge after hedge trimmer 72 is electrically connected by an extension cord to a suitable source of electric power, to trim the hedge.

I claim:
1. Hedge trimming apparatus comprising:
a base;
a substantially horizontal platform pivotally connected to said base so as to be adjustably positioned relative to said base;
means for retaining said platform in an adjusted position relative to said base, said retaining means com- prising a block fixedly secured to an edge of said platform, a screw threadably received within an aperture disposed in said block, an arcuate arm fixedly secured to a lateral edge of said base adjacent to said edge of said platform, said arcuate arm having an arcuate slot disposed therein, said screw disposed through said arcuate slot and selectively engaging said arcuate arm upon the tightening of said screw;

wheel and handle means connected to said base;

a substantially vertical tubular pedestal on said base;

a column telescopically received and adjustably mounted in said pedestal;

a substantially horizontal tubular sleeve mounted on one end of said column;

a shaft slidably adjustable within said tubular sleeve; and a bracket for mounting an electric hedge trimmer in either a vertical or horizontal position on the end of said shaft, said bracket having a first open-ended bore with a substantially horizontal longitudinal axis relative to said platform and a second open-ended bore with a substantially vertical longitudinal axis relative to said platform, said first and second bores for receiving a portion of said hedge trimmer therein.

2. Hedge trimming apparatus in accordance with claim 1, including a counter-weight tensioning device between said platform and horizontal tubular sleeve.

3. Hedge trimming apparatus in accordance with claim 2, wherein said tensioning device includes:
  a turnbuckle; and
  variable length means adjustably mounted between said turnbuckle and said platform and said turnbuckle and said sleeve.

4. Hedge trimming apparatus in accordance with claim 1, wherein said column includes a plurality of vertically spaced annular grooves, and said pedestal includes means positionable in selected ones of said groove for retaining said column in a vertically adjustable position relative to said pedestal.

5. Hedge trimming apparatus in accordance with claim 1, wherein said shaft includes a plurality of dentents spaced along the surface thereof, and means on said sleeve cooperable with selected ones of said detents for retaining said shaft in a horizontally adjusted position in said sleeve.

6. Hedge trimming apparatus in accordance with claim 1, including a level indicator on said platform to indicate a horizontal adjusted position of said platform relative to said base.

* * * * *